United States Patent
Krikorian et al.

(10) Patent No.: US 9,877,070 B2
(45) Date of Patent: *Jan. 23, 2018

(54) FAST-START STREAMING AND BUFFERING OF STREAMING CONTENT FOR PERSONAL MEDIA PLAYER

(71) Applicant: SLING MEDIA INC., Foster City, CA (US)

(72) Inventors: Jason Gary Krikorian, Woodside, CA (US); Blake Gary Krikorian, Hillsborough, CA (US); Bhupendra Natwerlal Shah, Booney Lake, WA (US); Alexander Gurzhi, Cupertino, CA (US); Satish Iyer, Bangalore (IN)

(73) Assignee: SLING MEDIA INC., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/221,882

(22) Filed: Jul. 28, 2016

(65) Prior Publication Data

US 2016/0337690 A1 Nov. 17, 2016

Related U.S. Application Data

(63) Continuation of application No. 14/798,227, filed on Jul. 13, 2015, now Pat. No. 9,432,435, which is a (Continued)

(51) Int. Cl.
*H04N 7/173* (2011.01)
*H04N 21/44* (2011.01)
(Continued)

(52) U.S. Cl.
CPC . *H04N 21/44004* (2013.01); *H04L 29/06027* (2013.01); *H04L 47/12* (2013.01); *H04L 65/4069* (2013.01); *H04L 65/4076* (2013.01); *H04L 65/4092* (2013.01); *H04L 65/602* (2013.01); *H04L 65/607* (2013.01); *H04N 19/102* (2014.11); *H04N 19/107* (2014.11); *H04N 19/115* (2014.11); *H04N 19/117* (2014.11); *H04N 19/132* (2014.11); *H04N 19/137* (2014.11); *H04N 19/14* (2014.11);
(Continued)

(58) Field of Classification Search
CPC .......................... H04N 7/17218; H04N 7/173
See application file for complete search history.

(56) References Cited

U.S. PATENT DOCUMENTS 5,237,420 A 8/1993 Hayashi
5,377,332 A 12/1994 Entwistle et al.
(Continued)

OTHER PUBLICATIONS

U.S. Appl. No. 11/620,711, filed Jan. 7, 2007.
(Continued)

*Primary Examiner* — Hunter B Lonsberry
(74) *Attorney, Agent, or Firm* — Lorenz & Kopf LLP (57) ABSTRACT

Systems and methods allow playback of a media stream received via a network. The media stream is received and stored in a buffer prior to playback. Responsive to receiving the user command to change the content of the media stream, the buffer is flushed prior to receiving the changed content in the media stream.

20 Claims, 2 Drawing Sheets

Related U.S. Application Data continuation of application No. 14/144,225, filed on Dec. 30, 2013, now Pat. No. 9,106,723, which is a continuation of application No. 13/079,644, filed on Apr. 4, 2011, now Pat. No. 8,621,533, which is a continuation of application No. 12/643,812, filed on Dec. 21, 2009, now Pat. No. 7,921,446, which is a continuation of application No. 11/147,985, filed on Jun. 7, 2005, now Pat. No. 7,647,614.

(60) Provisional application No. 60/577,833, filed on Jun. 7, 2004.

(51) Int. Cl.

| | | |
|---|---|---|
| *H04N 21/4402* | (2011.01) | |
| *H04N 21/439* | (2011.01) | |
| *H04L 29/06* | (2006.01) | |
| *H04N 21/234* | (2011.01) | |
| *H04N 21/258* | (2011.01) | |
| *H04N 21/432* | (2011.01) | |
| *H04N 21/433* | (2011.01) | |
| *H04N 21/436* | (2011.01) | |
| *H04N 21/438* | (2011.01) | |
| *H04N 21/63* | (2011.01) | |
| *H04N 21/6587* | (2011.01) | |
| *H04N 21/472* | (2011.01) | |
| *H04N 19/172* | (2014.01) | |
| *H04N 19/102* | (2014.01) | |
| *H04N 19/115* | (2014.01) | |
| *H04N 19/61* | (2014.01) | |
| *H04N 19/107* | (2014.01) | |
| *H04N 19/117* | (2014.01) | |
| *H04N 19/132* | (2014.01) | |
| *H04N 19/14* | (2014.01) | |
| *H04N 19/137* | (2014.01) | |
| *H04N 19/152* | (2014.01) | |
| *H04N 19/162* | (2014.01) | |
| *H04N 19/164* | (2014.01) | |
| *H04N 19/182* | (2014.01) | |
| *H04N 19/80* | (2014.01) | |
| *H04N 19/85* | (2014.01) | |
| *H04N 19/40* | (2014.01) | |
| *H04N 19/169* | (2014.01) | |
| *H04L 12/801* | (2013.01) | |
| *H04H 60/80* | (2008.01) | |

(52) U.S. Cl.
CPC ......... *H04N 19/152* (2014.11); *H04N 19/162* (2014.11); *H04N 19/164* (2014.11); *H04N 19/172* (2014.11); *H04N 19/182* (2014.11); *H04N 19/188* (2014.11); *H04N 19/40* (2014.11); *H04N 19/61* (2014.11); *H04N 19/80* (2014.11); *H04N 19/85* (2014.11); *H04N 21/23406* (2013.01); *H04N 21/25891* (2013.01); *H04N 21/4325* (2013.01); *H04N 21/4331* (2013.01); *H04N 21/4383* (2013.01); *H04N 21/4384* (2013.01); *H04N 21/4398* (2013.01); *H04N 21/43615* (2013.01); *H04N 21/4402* (2013.01); *H04N 21/440263* (2013.01); *H04N 21/47202* (2013.01); *H04N 21/47217* (2013.01); *H04N 21/632* (2013.01); *H04N 21/6587* (2013.01); *H04H 60/80* (2013.01)

(56) References Cited

U.S. PATENT DOCUMENTS

| | | | |
|---|---|---|---|
| 5,541,852 | A | 7/1996 | Eyuboglu et al. |
| 5,870,144 | A | 2/1999 | Guerrera |
| 6,067,118 | A | 5/2000 | Chen et al. |
| 6,097,441 | A | 8/2000 | Allport |
| 6,157,674 | A | 12/2000 | Oda et al. |
| 6,359,902 | B1 | 3/2002 | Putzolu |
| 6,456,781 | B1 | 9/2002 | Rijckaert |
| 6,493,874 | B2 | 12/2002 | Humpleman |
| 6,970,602 | B1 | 11/2005 | Smith et al. |
| 7,317,759 | B1 | 1/2008 | Turaga et al. |
| 7,616,955 | B2 | 11/2009 | Kim |
| 7,725,912 | B2 | 5/2010 | Vlargulis |
| 7,913,278 | B2 | 3/2011 | Ellis et al. |
| 7,917,932 | B2 | 3/2011 | Krikorian |
| 7,921,446 | B2* | 4/2011 | Krikorian ......... H04L 29/06027 725/110 |
| 8,266,657 | B2 | 9/2012 | Margulis |
| 8,346,605 | B2 | 1/2013 | Krikorian et al. |
| 8,621,533 | B2* | 12/2013 | Krikorian ......... H04L 29/06027 725/93 |
| 8,904,455 | B2 | 12/2014 | Krikorian |
| 9,106,723 | B2* | 8/2015 | Krikorian ......... H04L 29/06027 |
| 9,237,300 | B2 | 1/2016 | Krikorian |
| 9,432,435 | B2* | 8/2016 | Krikorian .......... H04N 21/4398 |
| 2001/0004733 | A1 | 6/2001 | Eldering |
| 2002/0032907 | A1 | 3/2002 | Daniels |
| 2002/0059591 | A1 | 5/2002 | Nakagawa |
| 2002/0131497 | A1 | 9/2002 | Jang |
| 2002/0196853 | A1 | 12/2002 | Liang et al. |
| 2003/0001016 | A1 | 1/2003 | Fraier et al. |
| 2003/0070167 | A1 | 4/2003 | Holtz |
| 2003/0088687 | A1 | 5/2003 | Begeja et al. |
| 2003/0105831 | A1 | 6/2003 | O'Kane |
| 2003/0220905 | A1 | 11/2003 | Amado et al. |
| 2003/0231655 | A1 | 12/2003 | Kelton et al. |
| 2005/0246738 | A1 | 11/2005 | Lockett et al. |
| 2006/0287916 | A1 | 12/2006 | Starr et al. |
| 2009/0074380 | A1 | 3/2009 | Boston et al. |

OTHER PUBLICATIONS

U.S. Appl. No. 13/609,033, filed Sep. 10, 2012.
U.S. Appl. No. 13/730,425, filed Dec. 28, 2012.
U.S. Appl. No. 60/577,833, filed Jun. 7, 2004.
U.S. Appl. No. 60/823,066, filed Aug. 21, 2006.
USPTO, Final Office Action in U.S. Appl. No. 13/730,425 dated Oct. 18, 2016.
USPTO, Notice of Allowance and Fee(s) Due in U.S. Appl. No. 13/194,834 dated Oct. 21, 2016.
USPTO, Office Action in U.S. Appl. No. 15/251,483 dated Nov. 4, 2016.
USPTO, Office Action in U.S. Appl. No. 14/979,271 dated Sep. 2, 2016.
USPTO, Office Action in U.S. Appl. No. 13/194,783 dated Sep. 20, 2016.
USPTO, Notice of Allowance and Fee(s) Due for U.S. Appl. No. 14/979,271 dated Mar. 27, 2017.
USPTO, Final Office Action for U.S. Appl. No. 13/194,783 dated Apr. 12, 2017.

\* cited by examiner

FAST-START STREAMING AND BUFFERING OF STREAMING CONTENT FOR PERSONAL MEDIA PLAYER

CROSS REFERENCE TO RELATED APPLICATIONS

This application is a continuation application of U.S. application Ser. No. 14/798,227, which was filed on Jul. 13, 2015. That application is a continuation application of U.S. application Ser. No. 14/144,225, which was filed on Dec. 30, 2013. That application is a continuation application of U.S. application Ser. No. 13/079,644, which was filed on Apr. 4, 2011. That application is a continuation application of U.S. application Ser. No. 12/643,812, which was filed on Dec. 21, 2009. That application is a continuation of U.S. patent application Ser. No. 11/147,985, which was filed on Jun. 7, 2005 and claims the benefit of U.S. Provisional Application No. 60/577,833, filed Jun. 7, 2004, which is incorporated by reference in its entirety.

BACKGROUND

Field of the Invention

This invention relates generally to personal streaming media broadcasters, and in particular to streaming media from a media source input to a client device over a network.

Background of the Invention

While people spend a great deal of time watching television programming and other forms of audio-visual (A/V) content, they are also spending an increasing amount of time interfacing with computing devices such as personal computers, personal digital assistants, mobile phones, dedicated multimedia devices, and other devices that, like the traditional television, include a display. These types of computing devices allow people to be increasingly mobile, but this mobility reduces the time people spend at home in front of their televisions. It would therefore be beneficial to enable people to enjoy their television programming and other forms of A/V content they now receive at home on these computing devices as well, regardless of location and without dependence on physical connections.

This ability would enable several desirable applications. For example, a user might want to access and control television and other regularly consumed A/V content from a personal computer (desktop as well as notebook computers) or other computing devices around the home via the user's local network in the home. Since cable, satellite, and other sources of television content typically enter the house at a few discrete locations, allowing access to the content over a home network gives the user more freedom to enjoy the content throughout the home. Another possible application would be to enable a user to access and control television and other A/V content from any number of remote networks where a broadband connection is available to the user (e.g., at an airport, at work, at school, in a hotel, in a cafe, at an acquaintance's house). Yet another application would be to enable a user to access and control television and other A/V content from a mobile phone or other computing devices that can be connected to a wide area network (e.g., GPRS, W-CDMA, CDMA-2000, 1×RTT, 1×EVDO, and the like). In various applications, users are likely to want to access their media content stored on devices, such as personal computers and other devices having storage, from remote networks. Nevertheless, network bandwidth and other limitations have made it difficult to provide an effective and enjoyable remote media experience for the user.

But traditional streaming media solutions do not enable these applications in any effective way; moreover, they suffer from technical limitations that would prevent their use in personal media broadcasting applications like those described above. Accordingly, it would be desirable to enable users to access their A/V content from any of a variety of remote locations inside or outside the home, as such content is currently available only from locations in the home that traditionally receive and play it (e.g., a television set).

SUMMARY

A personal media broadcasting system enables video transmission over a computer network, allowing a user to view and control media sources over a computer network from a remote location. In one embodiment, the personal media broadcasting system includes a personal media broadcaster and a media player. The personal media broadcaster may be configured to receive as an input virtually any media source. The broadcaster digitizes and compresses the received media content (if necessary) and streams the media over a computer network to the media player. The media player may reside on any of a wide range of client devices for viewing the media. A user may send control commands (e.g., "channel up") using the media player back over the network to be executed by the media source device, thus affecting the media stream received by the media player.

In one embodiment, a personal media broadcasting system includes a personal media broadcaster and media player client, which communicate with each other over a network. The personal media broadcaster can accept an A/V signal from one or more A/V source devices. From this A/V signal, the personal media broadcaster constructs a media stream that is suitable for transmission over a network to the media player client. The personal media broadcaster includes a network interface for transmitting the media stream to the media player client. As the media stream is received at the client, it can be viewed by a user using the media player client. In one embodiment, the personal media broadcaster is a dedicated appliance, not a general purpose computer. In this way, a general purpose computer need not be powered on and connected to the A/V source devices for the user to receive media content remotely. In another embodiment, the media player client can run on any general or multi-purpose device (such as a personal computer or cellular phone), beneficially avoiding the need for the user to carry special equipment to use the broadcasting system. The computer network over which the broadcaster and media player client communicate may comprise a wide area network, such as the Internet, allowing the user to receive media content from the home to anywhere in the world where a connection to the network is available.

To improve the user's experience, the person media broadcasting system may employ any of a number of techniques for buffering, transmitting, and viewing the content. In one embodiment, for example, the media stream is constructed by encoding the audio/visual signal using a bit rate selected at least in part based on an amount of free space remaining in an intermediate output buffer used to temporarily store the media stream before it is transmitted to the media player client. While various measures of occupancy of the intermediate output buffer can be used, one involves the use of multiple watermarks to measure the free space available in the buffer. The encoding bit rate can be decreased each time the free space dips below a watermark, while it can be increased when the free space rises above a watermark or if the free space never drops below the watermark in the first place. In this way, the encoding bit rate can be dynamically adjusted based on current performance of the system, and this dynamic adjustment can occur at the broadcaster without requiring feedback from the client.

In another embodiment, the media player client implements a fast-start mechanism by which the media player receives a media stream in real time from the personal media broadcaster and stores the media stream in a buffer. The media player client plays the received media stream from the buffer at a decreased playback speed without waiting for the buffer to fill to a predetermined threshold. While the playback speed is kept at a slower rate than the streaming media content is received, the buffer fills (albeit at a rate slower than the media stream is received). This allows the media player client to play a received media stream without waiting for its buffer to fills, which improves the user's experience dramatically in situations such as where the user is changing channels or operating a menu on the remote A/V source device. In addition, the media player client may further enhance this experience by switching into a control mode when the client receives a user command to control content in the media stream. When the client enters the control mode, the buffer is flushed and the received media stream is played. In this way, the content in the buffer need not be displayed on the client device, and the user can then almost immediately receive visual feedback confirming the user's command to control content in the media stream.

DETAILED DESCRIPTION

Overview

Embodiments of the invention allow for distribution of A/V content from a variety of A/V source devices over a computer network to a client device. As used herein, A/V content may include any type of media content, including audio or video content, or both. In one embodiment, a personal media broadcaster takes as an input an audio or video signal, digitizes and compresses the content (e.g., in Windows Media Video, MPEG-4, or H.264), and streams the content over an IP network (such as IP4 or IP6) to a client device for viewing and/or listening to the content. The personal broadcaster, which may be implemented as an embedded solution, may allow the user to issue control commands, such as "channel up" via an IR or serial command, back over the network to be executed by the original source device. Using various embodiments of the present invention, a user can connect to the personal broadcaster a cable or satellite set-top box, a personal video recorder, a DVD player, a DVD jukebox, a music server, a satellite radio receiver, a camcorder, a digital video recorder (DVR) or any other A/V source component. This way, the user can view and control the live output of these sources from any networked device. Various embodiments of the present invention may include different components, including a personal broadcaster and media player. The media player may be a software application that runs on a client device, which is configured to receive the media stream created by the personal broadcaster. Different client software applications can exist for different classes of client devices, such as personal computers and cell phones. The client may be able to connect to the personal broadcaster through a Web browser interface.

The system described herein may be applied in a number of applications or usage scenarios. For example, there are a variety of uses in the home over a wired or wireless home network for the system. In the home, users can view and control their A/V source components, such as a personal video recorder (PVR) or a cable set-top box, from any desktop PC, notebook PC, PDA, or other network devices. For example, this application allows a user to convert a wireless notebook PC situated in the kitchen into a wireless LCD TV. As another example of in-home use, young parents can pair a personal broadcaster with a simple analog camera and place them in the baby's room to provide a real time video and audio stream of their child displayed on a device in another location in the home.

Another usage scenario category relates to users who are away from home but have access to a broadband connection. This access can be in a variety of locations, such as at work, at school, at a friend's house, in a cafe, at the airport or in a plane, or in a hotel. From these locations, users can connect to their personal broadcaster over the public Internet and enjoy the same live television experience that they have at home. The present invention allows users that are away from home to access the full breadth of programming they are accustomed to, and even view content that they previously captured on their personal video recorder.

Yet another usage scenario category relates to individuals with mobile phones, communicators, or other wide area network devices. On emerging networks, the bit rate is now high enough for users to enjoy streaming video on their devices. This opens up new possibilities for the personal broadcaster to deliver a wealth of programming to the mobile user, all of which originates from the user's own home.

The media stream transmitted from the personal media broadcaster to the media player client networks can take advantage of a combination of any number of networking protocols, including HTTP over TCP/IP, as well as UDP, RTSP, RTP, RSVP, and the like. Because embodiments of the invention can accept, digitize, encode, and stream any analog A/V source, there are a vast number of uses for the personal broadcaster—from a security camera system to a method for extending a user's satellite radio to the user's cell phone.

System Architecture

Figure 1:
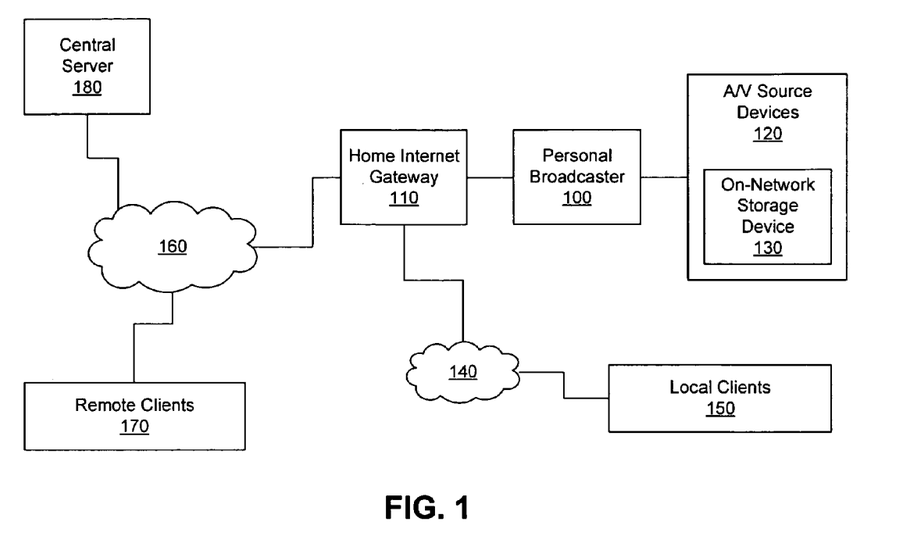
FIG. 1 is a block diagram of a media broadcasting system, in accordance with an embodiment of the invention.

FIG. 1 is a block diagram of the media broadcasting system in accordance with one embodiment of the invention. As illustrated, a personal media broadcaster 100 is configured to receive an input video signal from a wide variety of A/V source devices 120. For example, any component or device having analog A/V outputs can be connected to the personal broadcaster 100. Upon receiving the video and/or audio feed from a connected A/V source device 120, the personal broadcaster digitizes, encodes, and streams the digitally compressed media to the home Internet gateway 110. The gateway 110 may comprise one or more separate devices, including a router, a switch or hub, and/or an analog, DSL, cable or other type of broadband modem, or the gateway 110 may comprise a single device that encompasses one or more of these functions.

The gateway 110 may be coupled to a local area network (LAN) 140 that couples several computing devices in a user's home. According to known techniques, any number of local clients 150 may be able to communicate with the home Internet gateway 110. In this way, created by the media broadcaster 100 may be routed to any of these local clients 150 by way of the local network 140, either through the gateway no or directly. The local area network 140 can be wired or wireless, as the present invention is not limited to any particular network technology or configuration. The local clients 140 can be any number of device types, including but not limited to desktop and notebook PCs, Web tablets, PDAs, embedded clients built expressly for the purposes of decoding the streams of the personal broadcaster, and other devices capable of receiving and/or playing a media stream over a network.

The media streams created by the personal broadcaster 100 may also be received by remote clients 170 from a remote network 160. The remote network 160 may comprise any suitable networking technology, including but not limited to wide area mobile networks (e.g., GPRS, EDGE, 1x-RTT, 1x—EvDO, and FOMA 2.5G and 3G cellular networks), WiFi and other public broadband access locations, WiMAX networks, other LANs (such as at work, school, or a friend's home), and direct connections to other Internet service providers. As with the local clients 150, the remote clients 170 may include any number of device types, but not limited to desktop and notebook PCs, Web tablets, PDAs, embedded clients built expressly for the purposes of decoding the streams of the personal broadcaster, and other devices capable of receiving and/or playing a media stream over a network.

In one embodiment, the local clients 150 and/or the remote clients 170 execute a client software application that includes a user interface for requesting content from the broadcaster 100 and for viewing that content. In another embodiment, the client functionality is provided by a Web site and is accessible by the local clients 150 and/or the remote clients 170 via a Web browser. When a remote client 170 wishes to connect to the stream of the personal broadcaster 100 using the client application or via a Web browser interface, it may specify the home IP address of the user to access and pull the media stream from the personal broadcaster. This action sends a request to the personal broadcaster, and the request travels across the public Internet, to the network of the user's Internet service provider (ISP), into the home via the telephony or cable infrastructure (or wirelessly in the case of the fixed wireless or satellite broadband ISP), to the home Internet gateway 110, and finally to the personal broadcaster 100.

In one embodiment, a central server 180 is coupled to the remote network 160 and provides one or more roles, including that of DNS server. Because most residential ISPs allocate dynamic IP addresses via DHCP, as opposed to providing static IP addresses, there is a need for a system that provides a consistent method for accessing the user's home network from remote networks. In the embodiment illustrated in FIG. 1, the central server 180 assigns the personal media broadcaster 100 a DNS name (e.g., username.slingbox.com) and correlates that DNS name to the user's IP address. To account for the dynamic nature of the IP address, in one embodiment, a dynamic DNS client application resides on the personal broadcaster 100. The dynamic DNS client application reports to the central server 180 any change to the IP address leased by the ISP. When a remote client 170 needs to communicate with the broadcaster 100, the client 170 first obtains the associated IP address from the central server 180. In this way, the DNS address called by a user on a remote client 170 is the current IP address of the gateway 110, even when that address changes over time.

To make this process even easier for the user, so that the user need not manage a constantly changing IP address or enter a DNS name, much of the process for connecting to a personal broadcaster 100 can be abstracted from the user. For example, in one embodiment, the user need only to enter the name of the personal broadcaster, or select an icon representing the personal broadcaster, and then enter the corresponding password before being automatically directed to their personal broadcaster 100. This can be accomplished by tying a unique device name to the DNS name assigned to the user's dynamic IP address. The translation between the device user name and the DNS name can take place within the remote client 170 itself, or it can be accomplished through a directory maintained on the central server 180.

Connections from a local client 140 or a remote client 170 can be accomplished either by using a client application designed specifically for the purpose of accessing the personal broadcaster stream or via a traditional Web browser. The option of using a Web browser provides for wide range of client compatibility without the need for configuration, while the client application provides for an optimized experience. The client application or the Web interface may prompt the user for a password before allowing communication with the broadcaster 100, as a security measure. As an additional measure of security, the media stream can be encrypted.

In one embodiment of the invention, there is a limit of one connected client (applies equally to remote clients and local clients) per device. That is, only one client at a given point in time can be connected to and streaming from the personal broadcaster. Other variations of this embodiment can provide for multiple simultaneous sessions. Still other variations can allow for multiple simultaneous sessions from local clients, but maintain a single session limit for remote clients.

Figure 2:
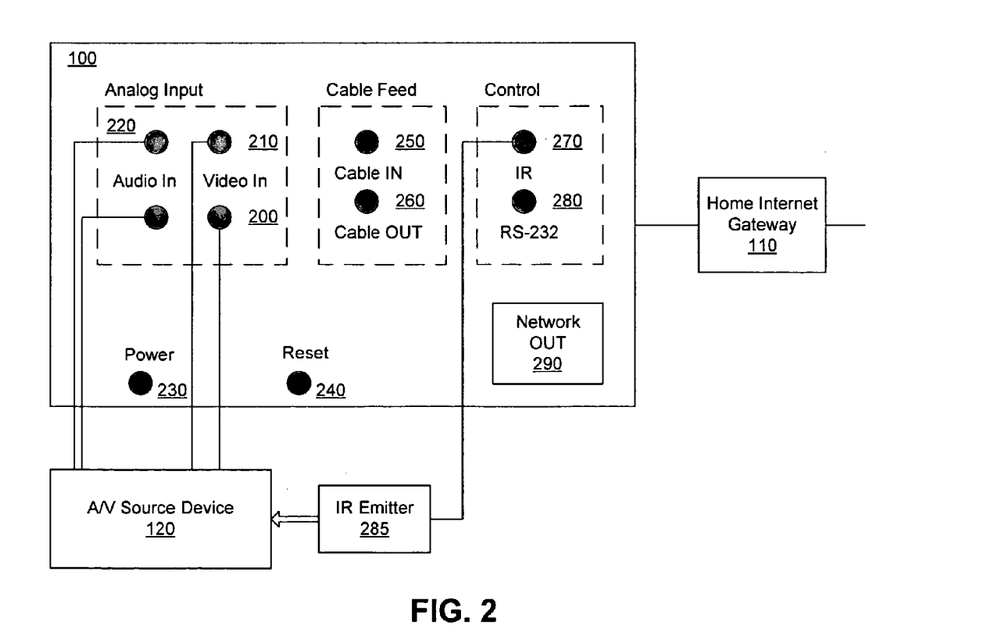
FIG. 2 is a block diagram of a set of input and output connections for a personal media broadcaster, in accordance with an embodiment of the invention.

FIG. 2 illustrates an embodiment of the personal media broadcaster 100 having an interface for receiving a video signal from a collection of possible A/V source devices 120. The personal broadcaster 100 can thus support a number of input types and possibly may include a number of outputs types, according to one embodiment of the present invention. In the embodiment illustrated in FIG. 2, the personal broadcaster 100 can support a composite video input 210, an S-video input 200, a coaxial cable input 250, and left and right audio inputs 220. The personal broadcaster 100 may also have a coaxial cable output 260, where the input cable signal is split inside the personal broadcaster 100 to allow a pass through of that signal for local viewing. Pass-through outputs for A/V, S-video, and any of the other inputs may also be provided for the same purpose. A wide variety of video and audio inputs are possible, in addition to those shown in FIG. 2. Inputs and outputs can be either analog (e.g., component video) or digital (e.g., DVI, IEEE 1394, USB, SDI, Toslink optical, or composite coax digital audio), and there may be multiple connectors of a single type.

FIG. 2 also includes an IR output 270 and/or an RS-232 output 280. These outputs are intended to provide the final leg of backchannel control that originates from the client device. Depending on whether the A/V source device 120 is controlled via IR or serial commands, the user connects an emitter cable from the appropriate output on the personal broadcaster 100 to a serial input or the IR receiver on the A/V source device 120. This provides the communication means that allows the client to control the A/V source device 120 (e.g., to change the channels).

In FIG. 2, the personal broadcaster also includes an Ethernet port 290 that provides a communication interface to the home Internet gateway 110. In some embodiments of the invention, the personal broadcaster 100 also supports wireless networking (e.g., through a built-in 802.11 capability), and the broadcaster 100 may even be built as an access point (AP) or router for a wireless network according to a wireless networking standard such as 802.11. The personal broadcaster 100 can also include a power connector 230, a hard reset button 240, and a number of indicator lights (e.g., on a front panel) that show the state of the personal broadcaster 100. Many other inputs and outputs are also possible. For example, the personal broadcaster 100 can have video and analog outputs for a local display and sound.

FIG. 2 also shows the connections possible between an A/V source device 130 and one embodiment of the personal broadcaster 100. As illustrated, an S-video cable and left and right composite audio cables connect the personal broadcaster 100 and an example A/V source device 120. Because the A/V source device 120 in this example is controlled via IR, controls called for by the remote client 170 or local client 150 are relayed from the personal broadcaster 100 to the A/V source device 120 via an IR emitter 285 (e.g., an IR blaster assembly). One end of the IR emitter 285 is plugged into the personal broadcaster 100, which "blasts" appropriate IR codes through a wire and out an IR LED of the IR emitter 285. Accordingly, the IR emitter 285 is placed directly in front of the IR receiver of the A/V source device 120.

The personal broadcaster 100 connects to the home Internet gateway no from its Ethernet port 290 (using, e.g., a Cat5 cable), which connection can be direct or via an Ethernet wall jack located near the personal broadcaster 100 (which in turn connects to the home Internet gateway 110). In other embodiments, the connection between the personal broadcaster 100 and the home Internet gateway no is wireless, where the broadcaster 100 may include built-in wireless or power line networking capability.

Figure 3:
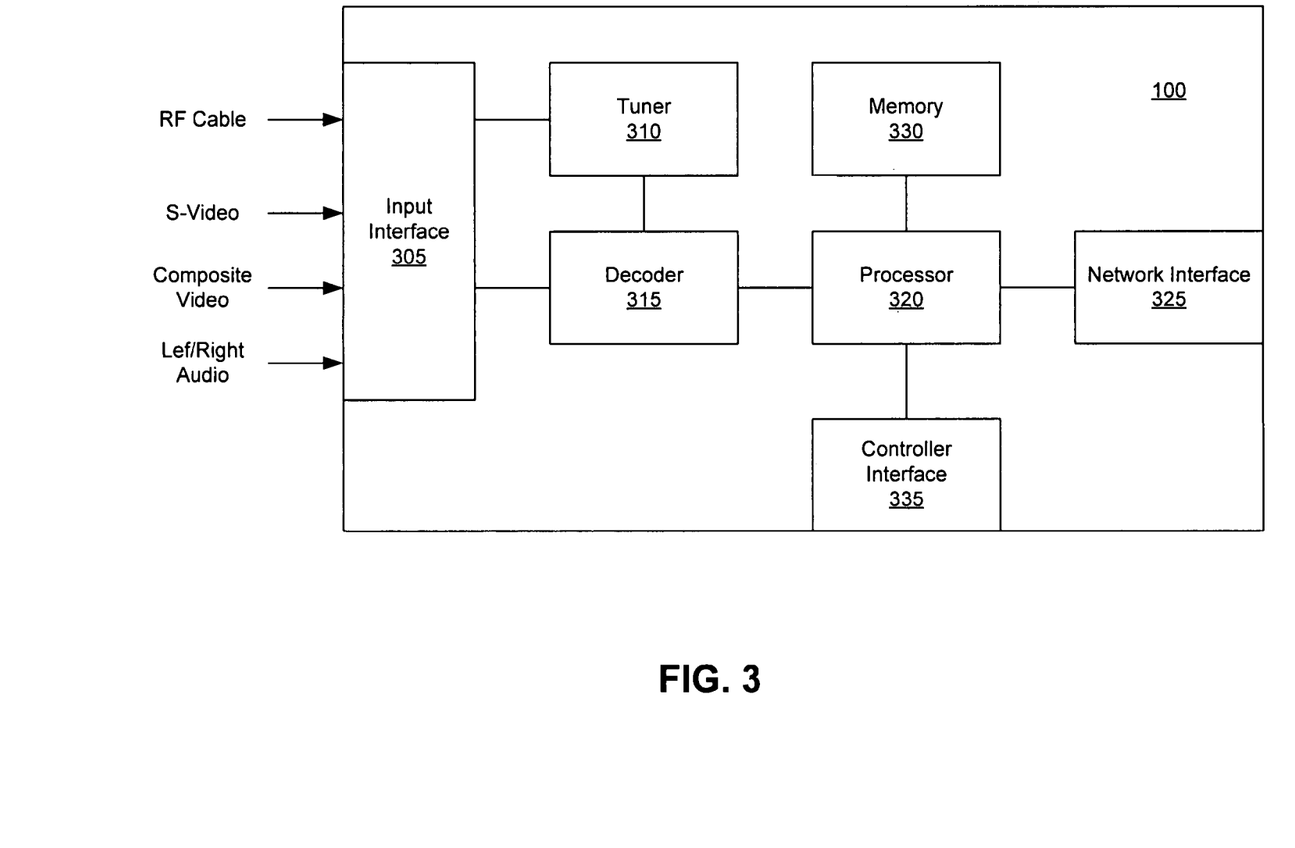
FIG. 3 is a block diagram of a personal media broadcaster, in accordance with an embodiment of the invention.

FIG. 3 is a block diagram showing the internal components of the personal media broadcaster 100, according to one embodiment of the invention. As shown, the broadcaster 100 includes an input interface 305 for receiving any of a variety of input types, including an RF signal from analog cable or antenna, an S-video signal, a composite video signal, and a left/right audio signal. Because an RF signal includes a number of video signals modulated therein, the input interface 305 is coupled to provide the RF input to a tuner 310. The tuner 310 filters the RF signal for a selected channel, demodulates the channel, and converts the signal into separate analog video and audio for further processing by an audio/video decoder 315. The input interface 305 is coupled to provide the S-video signal, a composite video signal, and a left/right audio signal directly to the A/V decoder 315, as those signals need not be processed by a tuner 310.

In one embodiment, the A/V decoder 315 converts the analog video input into YUV video and applies various types of filters and color corrections to the signal. The A/V decoder 315 also extracts vertical blanking interval (VBI) data, such as close caption, tele-text, and copy protection bits. The A/V decoder 315 also decodes the tuner audio and converts it into stereo or mono digital audio, depending on the broadcast signal. The analog signal is further converted into a digital signal in the A/V decoder 315. The digital video and audio from the A/V decoder 315 is then sent to a processor 320 for further processing. The personal broadcaster 100 may include memory 330, such as flash memory or SDRAM, used by the processor 320 for performing its associated processing tasks. The memory 330 may also be used as a buffer for the outgoing media stream, as described herein for various embodiments.

In one embodiment, the processor 320 performs pre-processing on the digital audio and video before compression. The pre-processing can be performed based on the input type, compression properties, and target bit rate. After pre-processing, the processor compresses the audio and video to a desired bit rate using any suitable compression technique (such as WM9, MPEG-4, H.263, and H.264). The compressed audio and video are multiplexed into a single media stream together along with other user data such as close caption, tele-text, parental control, and Macrovision. In one embodiment, the processor 320 is capable of statically and/or dynamically adjusting the compression bit rate, frame rate, resolution, and filtering depending on a user request, the input content, available network bandwidth, or on any other data known to the processor 320. The compressed media stream is then converted into network packets for transmission over the local network 140 or a remote network 160 via the network interface 325. The network interface 325 may be a wireless or a wired interface, or may have provisions for both types. As mentioned above, the personal broadcaster 100 may also receive and process commands received from a client over the network interface 325. Some examples of these commands include selecting a particular channel, automatic scanning of channels, switching between RF input and base-band input, changing compression properties (compression type, bit rate, frame rate, resolution, and other properties), remotely controlling commands for the IR blaster, and any other command that a user may desire for viewing content from the A/V source device 120.

The broadcaster 100 may further comprise a controller interface 335 for interfacing with an output for controlling an A/V source device 120. As mentioned above, control of an A/V source device 120 may be performed using an RS-232 serial controller or an IR emitter 285. The controller interface 335 thus receives the appropriate output signals from the processor 320 and provides the corresponding interface for controlling an operation of an A/V source device 120.

While FIG. 3 shows an embodiment of the broadcaster 100 that only takes analog inputs, other embodiments may accept digital inputs as well. For example, embodiments of the present invention can be incorporated into service offerings from cable MSOs or DBS providers. In these variations, the personal broadcaster can have direct access to the digital bit stream being broadcast. This can be through incorporation of the personal broadcaster into a set-top box or home Internet gateway by the service provider, or through some digital interconnect such as IEEE 1394 or USB 2.0. With access to the digital bit streams, digitizing and encoding/compression of the streams can be entirely unnecessary. For these inputs, however, the personal broadcaster can be asked to transrate or transcode the media to a bit rate that is low enough for effective distribution across local area networks and upstream through a home Internet gateway and out to the public Internet for connection by remote clients. In variations that include digital inputs, analog inputs and a digitization and encoding function can still be present.

Despite the specific network topology illustrated in FIG. 1, there are many variations on the present invention that have the personal broadcaster placed in different positions relative to the other components. For example, one variation of one embodiment has the personal broadcaster incorporated into a home Internet gateway. By integrating with the router functionality, the broadcaster can completely automate the process of port configuration (e.g., port forwarding). Alternatively, if the home Internet gateway is actually two or more devices (e.g., a cable modem and a stand along router/switch), the personal broadcaster can be located between the cable modem and the router. Both of these variations of the present invention provide a unique quality of service opportunity. Because the personal broadcaster is upstream from all networked clients and can "talk" with the network router, the video streams from the personal broadcaster can be prioritized ahead of other, less time-critical traffic. The control can be applied both to traffic moving within the local area network as well as to traffic moving out from the local area network to the Internet. For example, a video stream coming from the personal broadcaster can be granted higher priority than a print job request over the local network, or an email download from a remote POP3 server. In either case, the personal broadcaster preferably incorporates a network switch as part of its architecture.

As shown in FIG. 1, the personal broadcaster 100 may also be able to receive a digital audio or video stream or other digital media from an on-network storage device 130. The on-network storage device 130 may be a personal computer, a networked attached storage device, or a dedicated media server. For example, a user could have a collection of audio and video clips stored on a personal computer or media server that resides on the same home network as the personal broadcaster. The user could then access the media on a remote client 170 over a remote network 160 by logging into the personal broadcaster 100.

When wishing to stream media stored on an on-network storage device 130 to a remote location, a challenge arises. The bit rate of the media clips present on the on-network storage device can be higher than the bit rate supported by the upstream link of the user's broadband service. For example, a video clip on an on-network storage device 130 can have a bit rate of 800 kbps, whereas very few broadband connections currently have an uplink speed equal to or greater than that. In such cases, the bit rate of the source media signal is reduced and its encoding format is possibility changed. The personal broadcaster 100 may perform this transrating and transcoding functionality. In this situation, the personal broadcaster 100 acts as a networked-attached transrater and transcoder. The broadcaster receives the media stream from the on-network storage device 130, transrates and possibility transcodes the media, and outputs a media stream with a sufficiently low bit rate so the media can be effectively streamed upstream from the user's broadband service. The method for determining the proper transrating or transcoding settings (e.g., the bit rate to which the source content is to be reduced) can be accomplished within the framework for determining the throughput currently supported between the personal broadcaster and the local or remote client, outlined below.

The use of the personal broadcaster 100 as an agent to transrate and/or transcode the material residing on one or more on-network storage devices 130 has the benefit of creating a system where only one device (the personal broadcaster) streams media upstream through the home Internet gateway no and out to the Internet 160. This is beneficial because the user does not have to make further configurations to the NAT or firewall of the home Internet gateway, which can include manually forwarding a port to allow direct access to each on-network storage device.

In addition to requiring further configuration, streaming content directly from the on-network storage device 130 can create security concerns for the user, especially if the on-network storage device is a PC. Because allowing a PC to stream directly upstream to the public Internet involves opening a port on the firewall/NAT that forwards to the PC, a user can be concerned that other personal or private information is at risk for being exposed. By relying on the personal broadcaster to be a gateway for streaming media to the public Internet, the PC or on-network storage device on which the media is stored need not have a port forwarded to it. In such an embodiment, the personal broadcaster is the only device for which NAT port configuration is required.

In addition, using the personal broadcaster instead of the on-network storage device to transcode and transrate content prevents the CPU on the on-network storage device 130 from being unnecessarily taxed. This is especially important if the on-network storage device 130 is a PC, because the increase in CPU utilization would detrimentally impact the performance of the PC for accomplishing other tasks.

Because the personal broadcaster 100 provides the user with access to the same A/V source devices 120 available at home, it makes sense to provide the user with an interface to the A/V source device 120 similar to the one used in the living room setting. Most often, this is a handheld remote control. In one embodiment, therefore, a "virtual" remote control is provided by the client application that includes either a generic image representing the A/V source device's remote control or an image or likeness of the actual A/V source device's remote control. Moreover, the client application may support a number of virtual remote controls, one customized for each A/V source device 120. Interfaces on the client application are thus selected by the user to resemble each particular A/V source device 120 found in the user's home. For example, if a TiVo personal video recorder is connected to the personal broadcaster, the user can decide to use the TiVo skin which modifies the virtual remote control on the client application to resemble the TiVo remote control. Remote control commands are mapped to the graphical image in such a way that a press of the button triggers the action suggested by the image of the button (e.g., pressing on CH+ button turns the channel from 3 to 4).

In one embodiment, the client application contains a database of remote control skins from which to choose. In this case, a central database maintained on the central server, is likely to update the client application upon configuration to ensure that the latest remote control skins are available to the users. In addition, third parties may be allowed to create and share images with commands mapped to particular regions of the image. In this case, a method for "plugging-in" the third party remote control skins is provided to the user. To allow third parties to create skins for the media player, an API is provided to allow access to some of the features and functionality within the media player client. Third party skins allow users to develop content as well as third party device manufacturers and service providers to make virtual remote controls that closely resemble the physical remote control associated with an A/V source device 120. The virtual remote on the client application can thus be made easier to use, since the user is used to its layout.

Operation of Personal Media Broadcasting System

As described above with reference to FIGS. 1 through 3, the personal media broadcaster 100 can receive an input video signal from any of a number of A/V source devices 120. The broadcaster 100 then prepares the received video signal as a media stream for being transmitted over a network to a remote or local client, where the media stream is viewed by the user. Additions, alternatives, and refinements to this general process are described below.

Control of Audio/Visual Source Devices

As stated above, embodiments of the personal media broadcaster allow a user to control an A/V source device from clients connected to the remote or local networks. The client may allow for control of the user's specific model of A/V source device. Upon initial configuration of the personal broadcaster and a client, the user indicates which make and model of A/V source device the user would like to control (e.g., TiVo Personal Video Recorder Series 2). The configuration software on the client then identifies the group of IR or serial codes that correspond to the specific A/V source in question. This can be performed by searching a database that ships with the included software, an updated database residing on the central server, or a database that resides on the personal broadcaster.

In one embodiment of the invention, the IR codes is then stored on the client device. When a user wishes to invoke a code, the user selects the given command on the control panel or virtual remote control in the client application. The client application then sends the corresponding IR or serial command over the IP network. Once the IR or serial command reaches the personal broadcaster, the personal broadcaster processes the code and sends it out the IR or serial output, triggering the requested action in the A/V source device. The connection between personal broadcaster and the A/V source device can be an IR emitter, in the case that the A/V source device was to be controlled via IR, or an RS-232 port, in the case that the A/V source device was to be controlled by serial commands.

In another embodiment, the IR and serial codes are stored on the personal broadcaster rather than the clients. In this case, a client device that requests a given command sends a notation representing that command (e.g., "CH UP" if the user wants to change the channel from 4 to 5) rather than the IR or serial control code itself. When the notation representing the command reaches the personal broadcaster, the personal broadcaster performs a simple lookup, and outputs the appropriate IR or serial code. Certain commands or selections made on the client device can activate a series of commands, also known as a macro. For example, by clicking on the "CNN" button (which can possibly be represented by a logo of the network), the combination of commands that tune the A/V source device to CNN would be triggered. For example, if CNN was channel 202 on a user's DirecTV system, a press of the "CNN" button can trigger the following commands in succession: "2," "0," "2," and "Enter."

To make the set up of multiple client devices easier, profiles of the A/V source devices used can be stored in the personal broadcaster during the configuration of the initial client device. This enables easy configuration for subsequent client devices, as the personal broadcaster informs the subsequent client device which A/V source devices it is able to connect to, and which IR or serial codes it uses.

Adjustment of Encoder Settings Based on Throughput and Device Capability

Because the broadcaster enables access of a media stream by a variety of client device types connected to the local area network as well a various remote networks, the available data throughput present between the personal broadcaster on one end and the local clients and remote clients on another can vary considerably based on network topology. There is also likely to be considerable throughput variation in a given connection, due to competing traffic and general network congestion. In one embodiment of the invention, a method for optimizing the audio (e.g., bit rate and sampling rate) and video (e.g., bit rate, resolution, and frame rate) compression based on available network bandwidth and capabilities of client device is implemented.

Because various embodiments of the present invention encompass both the personal broadcaster and the client devices, and these elements can operate in a 1:1 relationship (i.e., each broadcaster may accept only one client connection at a time), the two components are able to act in concert to optimize the experience for the user. In one embodiment, the optimization process includes an initial optimization stage and an ongoing optimization stage.

In the initial optimization process, the client and personal broadcaster communicate to mutually establish the capabilities of the client device, as well as the throughput of the connection between the personal broadcaster and the client device. The client device first requests the personal broadcaster to send a set number of bits to the client (this can happen automatically at first connection, or can be manually ordered by the user to recalibrate initial optimization). Based on the time it takes for the client to receive those bits, the client has an idea of the actual data throughput between the personal broadcaster and the client. With this information in hand, the client instructs the personal broadcaster to begin streaming at a rate compatible with this throughput. This is not likely to be the full rate of throughput, but some rate less (for example, 80% of throughput), to allow for inevitable variation in network bandwidth. In choosing the proper resolution setting, the application residing on the client notes its current capabilities (i.e., resolution of its display) and pairs the appropriate bit rate setting with the appropriate resolution setting in its command to the personal broadcaster.

The client can learn of its capabilities in several ways. One can be related to the version of the application itself. For example, the application for a Pocket PC can know that the device best supports streams at or below a certain resolution and frame rate. Another way is to take inventory of system resources before it sends the request. For example, the client can identify its display resolution and incorporate this information in the streaming request to the personal broadcaster.

The initial optimization process represents a starting point that can very well provide for the proper encoder settings. However, the variability of network bandwidth over time calls for a system that is dynamic in nature and capable of real time changes to the encoder settings. To address this variability, one embodiment of the present invention implements a feedback loop between the client and personal broadcaster to maintain the proper encoder settings over time. This feedback loop can be implemented in a number of ways. In one embodiment the client gives notification to the personal broadcaster when it experiences frame drops. Alternatively, the client communicates, from time to time, the size of the buffer, or the total measured throughput. The client may communicate any or all of these statistics, or any other data that reflects on the need to adjust the settings.

Given this feedback from the client, the personal broadcaster alters the encoder settings. For example, the personal broadcaster can reduce the encoding bit rate from 350 kbps to 280 kbps if the size of the buffer becomes reduced or an unacceptable number of frame drops are observed. The time between measurements and feedback received from the client can vary, and the figure depends on a balance between reacting quickly to significant changes and overcorrecting based on temporary blips. Based on the feedback, the personal broadcaster can adjust the settings upward (e.g., increase encoding bit rate) as well as downward.

While one embodiment provides for a method of automatic adjustment of encoder settings, the user may also have the ability to set the encoder settings manually. These manually adjustable settings include frame rate, bit rate, resolution, "quality," and time between key frames for video, bit rate and sampling rate for audio, as well as client side settings that can impact performance, such as buffer size and smoothing.

Adjustment of Encoder Settings Based on Programming Type

While the data throughput between the personal broadcaster and the client may be one important determinant of the proper encoding settings, the type of content being viewed may also be an important criterion. For example, fast motion video from a sports program requires a higher frame rate than a talk show, which features much less motion. Likewise, video with little movement can require comparatively lower bit rates or resolution than fast motion video to achieve an acceptable quality. This is because video with slower movement tends to be encoded much more efficiently. Accordingly, the encoder settings may be selected based on the type of programming being encoded.

There are various methods for determining the type of content being viewed, and hence the proper range of encoder settings. First, there can be settings that apply generally to all content on a given channel. By identifying the programming channel or network to which the personal broadcaster is tuned (e.g., HBO or NBC), the client can request suitable encoder settings. For example, there can be a rule that when the personal broadcaster is streaming content from ESPN, the frame rate is always set at 30 frames per second. Such rules can be stored on the client or on the central server, which informs the client of the proper settings for a requested channel. Moreover, the rules can be learned over time by an individual's own client, which observes the settings chosen by the user for certain network programming.

In a further refinement, the encoder settings may be customized based on the specific programming being watched. Because a major network typically has content that is both demanding, high-motion programming (such as a major sporting event) and easy, low-motion programming (such as a newscast), selecting encoder settings based solely on the channel may not be efficient for many channels. Accordingly, by cross referencing the current channel with the current time of day, the system can determine the program that is being viewed, and the encoder's settings can be selected based on the actual program being viewed.

In another embodiment, the system constantly monitors the A/V content being encoded. Metrics based on preselected criteria (e.g., amount of motion in video) are generated, and this information is used to assign or adjust the encoder settings to the personal broadcaster dynamically. Alternatively, the media player may receive from the user an indication of what kind of content is being watched (e.g., action, music, news, etc.), which is mapped to predefined profiles in the framework optimized for that kind of content.

Buffering and Control of Buffer Resources

In accordance with one embodiment of the invention, the personal media broadcaster implements a buffering scheme to manage its buffer resources without requiring feedback from a client device. As mentioned above, the broadcaster and the client may communicate using TCP as a transport protocol, where the broadcaster acts as a server. Beneficially, TCP is a reliable protocol and ensures that sent data always reaches its destination in the correct order. Parameters and/or behavior of the TCP stack on a server can be monitored to estimate network congestion and speed according to one or more known techniques.

In accordance with an embodiment of the invention, a large buffer is added between the encoder (which generates the data) and the TCP stack on the network interface (which transmits the data). This additional buffer layer added above the TCP stack helps to avoid loss of data due to network congestion and the variability of data rates. In one embodiment, with reference to FIG. 3, the encoder functionality is performed by the processor 320, the TCP stack functionality performed by the network interface 325, and the buffer layer implemented in the general memory 330 or in a memory module dedicated for the large buffer. The size of this buffer can be selected in consideration of at least two parameters: the minimum data that can be generated by the encoder and the maximum network down time that has to be supported. Although the system cannot prevent data loss when available bandwidth goes below minimum bandwidth required by the broadcaster for extended period of time, a larger buffer helps to reduce this risk.

As the data for the media stream are being generated by the broadcaster, the intermediate buffer acts as a FIFO queue. When the available network bandwidth is more than the encoder's bandwidth, the broadcaster is able to send data as soon as it is generated. The intermediate buffer will begin to empty. When the available network bandwidth is less than the encoder's bandwidth, the broadcaster will generate the data faster than it can be transmitted. This will begin to fill the buffer. The buffer may therefore vary between being completely full and completely empty. To classify the occupancy of the buffer, a number of watermarks are defined to indicate the amount of free space left in the buffer. While the number of watermarks can vary, in one embodiment four watermarks are used—at the 90%, 75%, 50%, and 30% levels. As data are added to and taken from the buffer, the amount of data filling the buffer can change over time. When this level reaches one of the watermarks, various actions are taken depending on which watermark has been reached.

The amount of free space left in the intermediate buffer is observed for a period of time (e.g., one minute). If the amount of free space in the buffer remains above the 90% watermark during the last observation period, the encoder's output bit rate may be increased. Although any increase can be implemented based on the application, in one embodiment the increment is about 10% of the bit rate then being used.

Because network bandwidth varies over time, sudden drops in available bandwidth may take place frequently. In such cases, the TCP stack transmit rate will go down and the occupancy of the intermediate buffer will increase. If this occurs for a long enough period, the free space in the buffer will decrease so that the 90% watermark may be breached. In response, the broadcaster reduces the encoder's bit rate by a small percentage, for example about 15% of the bit rate then being used. If this network problem is a temporary one, the TCP stack will again be able to send the backlog of data in the buffer so that the amount of free space in the buffer will rises again above the 90% mark. The encoder's bit rate can then be increased.

On the other hand, if the network problem persists, the amount of free space will continue to decline. Over a period of time, the buffer will fill and the other watermarks will be breached. As each watermark is breached, the encoder's bit rate is further reduced. In one embodiment, these subsequent reductions may be larger (e.g., 33%, 50%, 50% for each watermark, respectively).

As described, the system intelligently exploits TCP stack behavior to estimate network status and reacts to provide optimal user experience in presence of bandwidth variations. This may offer improved performance as compared to using client-server interaction, which can be complicated, react more slowly, and may not make correct decisions if the encoder's output bit rate is expected to vary.

Fast-Start Streaming

Conventionally, when a streaming media player receives a command to play a media stream, the media player fills its audio/video buffers before starting the playback. A buffer of five seconds or longer is typically maintained to ensure smooth playback of the media, since the time taken to transfer the media stream over a network typically varies while the media stream is meant to be played at a constant rate. Once the required amount of data is accumulated to fill the buffer sufficiently, the media player starts playing the requested content at normal play speed (i.e., 1.0.times.). Disadvantageously, the user must wait the amount of time required to fill the buffer before viewing the requested content. This time may be very small in applications that send the stream faster than real time (e.g., a media stream from a storage device), but it is noticeable when the received media stream is at normal playback speed (i.e., 1.0.times.). In such a case, filling a five-second buffer would take five seconds (assuming no network communication issues). While this delay may be tolerated in some streaming media applications, it becomes unbearable where the media streams are changing, such as in a personal media broadcaster in which the viewer is changing channels. In such a case, the user would have to wait for the buffer to refill each time the channel (and thus the media stream) is changed.

To avoid this disadvantage, in one embodiment of the invention, the media player performs a fast start when a new media stream is selected. With the fast start, the media player client application plays the video immediately as it is received from the media broadcaster while still filling its buffer. In this way, the user does not have to wait for the media player's A/V buffers to fill up, e.g., upon channels changes, and the media player can still build its buffers to provide smooth playback. The media player is able to fill its buffers even though it plays the media stream immediately because the media player plays the A/V stream slightly slower than normal play speed. By playing the stream slightly slower than normal playback speed, the part of the received media stream that runs ahead of the stream played back is added to the buffer, resulting in accumulation of the A/V buffer—albeit more slowly. Because the user need not wait for content to be buffered and can immediately start watching the content, the experience is much more similar to that with a normal television.

In one example, the media player begins in fast-start mode playing back a received media stream immediately but at slightly slower speed than normal play speed, e.g., 0.85.times. speed. Since the broadcaster is streaming at normal speed, the media player slowly accumulates media stream data in its A/V buffer. For example, if the playback speed is 85% normal, the data accumulates in the A/V buffer at a rate of 15% (or 1.5 second for every 10 seconds of received streaming data). Once the media player's buffer is full or otherwise reaches an acceptable level, the media player begins to play the media stream at a normal rate, and the A/V buffer stops accumulating data.

When the play speed of stream is changed slightly, the change in the video stream is generally not noticeable. However, the change in audio becomes immediately perceptible. To take care of this, the media player may use time-stretching on the audio stream while maintaining the "pitch" in the audio stream. One software tool that can be used to time-stretch the audio stream is SoundTouch, an open-source audio processing library. In one embodiment, the playback speed is increased gradually from the low threshold (e.g., 0.85.times.) to the real time playback speed (e.g., 1.0.times.). The rate at which the playback speed is increased may be a function of the buffer level, so the user does not perceive any drastic change in the playback speed. The timestamps of the audio and video samples may be changed according to the existing playback speed to reduce jerks in the video stream. As a result, the change in the audio stream is also not perceptible, and the user is less likely to perceive the difference between the normal streaming speed and the initial fast-start playback speed.

Control Mode for Low Latency

One of the most used features in TV viewing is channel control, and users expect such control operations to take at most one second to execute. But streaming video over IP networks performs best when some delay is added between the server and the client. This delay is needed to fill the A/V buffers in the media player client. The two requirements of low delay for user interactions and smooth audio-video display are conflicting in nature. To deal with both of these requirements, in one embodiment of the invention, two modes of operations are introduced: normal mode and control mode.

In the normal mode, the system performs conventional audio-video streaming, wherein a buffer of five or more seconds is maintained by the media player to ensure smooth playback. In this mode, the media broadcaster may also start buffering data if the network bit rate drops below encoder bit rate (i.e., the encoder at the broadcaster runs ahead of the media stream transmission). The total delay between video input to the media broadcaster and its viewing on the media player is thus the sum of three parameters: the time taken to buffer on the media broadcaster, the network transmission time taken for the stream to move from the media broadcaster to the media player, and the time taken to buffer on the media player. The network transmission time taken for the stream to move from the media broadcaster to the media player cannot be directly controlled; however, both the media broadcaster and the media player can minimize delays caused by their buffers.

The system enters control mode when the user starts interacting with the media broadcaster by way of the media player. In one embodiment, user interaction is defined as when the user requests an IR command or tuner command to control the operation of the A/V source device through the media player user interface. In one embodiment, the system returns to normal mode from control mode after a predetermined amount of time has passed since the last action that could cause the system to start control mode. In another embodiment, the system returns to normal mode immediately after it performs the operations associated with going into control mode, as described below.

On entering control mode, the media player and the media broadcaster change their behavior relative to that in normal mode in a number of ways.

As mentioned, in the normal mode the media player performs normal A/V streaming wherein the media player reads the media stream from the network buffer, parses the stream, and fills its audio/video buffers. This buffer is maintained to ensure smooth playback. When going into control mode, the media player flushes the data that is present in the A/V buffers and the network buffer. In one embodiment, when going into control mode, the media player makes the source filter flush all the data buffered in the A/V buffers and also in all the filters downstream (decoders and renderers), which may be holding 2-3 seconds worth of content. SP then flushes all the data present in the network buffer. Thereafter, the media player sends a notification to the media broadcaster to go into control mode and waits for the next I-frame received from the media broadcaster.

After the flush operation on the source filter and the network buffer, discontinuities occur in the media stream. The filter has intelligence built in so that if there is any packet discontinuity in the media stream, the filter waits for the next I-frame. Any incoming data that is not an I-frame is discarded by the source filter until a valid I-frame is detected. When the media broadcaster goes into control mode, it sends an I-frame immediately. As soon as this I-frame is detected by the source filter, it is sent downstream for rendering. While the media player remains in control mode, no buffering occurs in the source filter; the samples are sent downstream for rendering as soon as they are read from the network buffer. In this manner, the media player reduces the latency on the client side.

In one embodiment, upon a change into control mode, the media broadcaster stops buffering data and flushes data currently contained in its buffers. The media broadcaster then immediately generates an I-frame (also known as key frame) to send to the media player. The I-frame allows the media player to reconstruct an image, whereas other types of frames that encode the frame based on previous frames would not allow the media player to reconstruct the frame due to the discontinuity in the media stream.

Given the dependency of modern audio-video encoding standards, however, it may not be desirable for the media broadcaster to stop buffering data completely. This is because without buffering there may be too much data loss, leading to an extremely poor user experience. A compromise can therefore be made to balance low delay and a reasonable user experience. Based on a set of empirical values for achieving a good balance, an amount of data is allowed to be buffered by the media broadcaster during control mode as a function of bit rate of content. For example, in control mode, buffered data can be reduced by flushing the data if it crosses a limit of about one second; however, other empirical values may be used for various applications.

In one embodiment, the media broadcaster keeps track of effective transmission bit rate, for example by periodically calculating the average transmission bit rate for the last few seconds. Based on the bit rate it calculates permissible buffer usage. If usage goes beyond the current limit then all data is removed and an I-frame is forced. This also means encoder output rate is more than network transmission rate; therefore, encoder output is reduced to half of observed transmission rate. Due to the resulting discontinuity in the media stream, an I-frame is also forced.

Too many user control commands in quick succession will force many I-frames, which will adversely affect the encoder. Therefore, all buffer flushes and forcing of I-frames are preferably timed and spaced out by at least one second.

When returning to normal mode from control mode, the source filter of the media player pauses the playback, buffers (e.g., up to five or more seconds) content in the A/V buffers, and then sends the data downstream for rendering.

To operate effectively in a low latency, low buffer environment, a command can be immediately sent to the personal broadcaster to reduce the bit rate when in control mode. Without any additional adjustments, this would result in a reduction in image quality; however, because the menu screens being navigated typically feature very little motion, the frame rate of the video can be significantly reduced. With less frames to process, the personal broadcaster can output a stream with image quality good enough to effectively read the on-screen text.

The low latency achieved by the dual mode operation of this embodiment is a very desirable characteristic for systems in which the users interacts with the media broadcaster through the media player. The addition of a control mode achieves this low latency, while the return to normal mode once user interaction has stopped achieves the smooth streaming desired for normal viewing. Moreover, in combination with the fast-start streaming described above, the control mode function provides a low latency control interaction experience for the user with a seamless transition from control mode to normal viewing.

Trick Play of Received IP Stream

In one embodiment, a user viewing a live stream being encoded in real time by the personal broadcaster and displayed on the media player can replay the last several seconds or minutes of content just viewed, or it can pause the live stream for resumption at some point in the near future. The personal broadcaster receives and processes the analog input signal; converts it into digital format; encodes the video in a compression algorithm such as MPEG-4, H.264, Windows Media Video Series 9, or another appropriate format; and then streams the encoded via stream over TCP/IP (or an alternative protocol, such as UDP, RTP, RTSP) to the media player.

To enable this functionality, the media player caches the last five minutes (or some other fixed period of time as chosen by user or limited by product manufacturer) of the audio and video content to a local storage medium while receiving a video stream. The media player may store the data on a local storage medium, such as a hard drive in the case of a PC, or some removable media, including but not limited to compact flash, smart media, a memory stick, or a micro drive.

When the user wishes to pause or replay the content, the user instructs the media player to do so by selecting an appropriate labeled button in the media player user interface. When the user instructs the media player to rewind, the media player accesses the content cached in its storage, allowing the user to scan through it, and play as desired. Once the user has "rewound" content, the user can then "fast forward" the viewing of the stream at faster than real-time speed until the current-most point in the video stream is being displayed. When the user instructs the media player to pause, the media player pauses the video stream being displayed but continues to receive the incoming stream, which it caches to its local storage medium. The media player continues to cache the stream as it is received, until the point when the maximum number of minutes (or size of data) allowed to be cached when in pause mode is reached. If the maximum number of minutes (or size of data) is reached, the media player resumes playback. Otherwise, the media player resumes playback when the user instructs the media player to do so.

Capturing, Editing, and Sending Video Clips from a Streaming Source

Embodiments of the invention also allow people to send video clips to friends and acquaintances. In accordance with one embodiment, the media player device continually captures and caches the last five minutes (or some other designated time period) of video and audio received. The media player automatically discards the earliest recorded content when the cached stream hits five minutes (or some other designated time period), so that the five minutes being cached is always the five most recent minutes of media streamed.

When a user sees something of interest that the user would like to capture and save or share, the user clicks on or selects a designated button or command using the media player's graphical interface. Once selected, the media player brings up a simple video editing interface, which enables the user to select the beginning and end of the clip that the user would like to capture. Once the bounds of the clip have been selected, the user selects a command to save the clip or send the clip to another person.

In response to a command to send the captured video clip, the media player calls the email client resident on the user's client device, creates a new message, and attaches the video clip to the message. The user can then select the intended recipients of the message and send the message. The address book databases can be those available from email clients such as Microsoft Outlook, Lotus Notes, and others, as well as any Internet based messaging services, such as MSN Messenger and AOL Instant Messenger.

Personal Video Recorder (PVR) Functionality for Mobile Devices

As users get more accustomed to video experiences on mobile devices, and mobile storage solutions (e.g., removable flash media and small hard disk drives) become more robust and inexpensive, the desire to add personal video recorder functionality to these devices will emerge. One embodiment of the present invention adds the functionality of a personal video recorder to a mobile phone, communicator, PDA or other device connecting to a Wide Area Network or other remote network outside a user's local area network.

One variation that accomplishes this can feature a scheduler as part of the remote client application which coordinates with an electronic programming guide. When the user launches the remote client application, he can search for and select the shows he would like to have recorded to his remote client. When the time for the scheduled recording occurs, the remote client application initiates a recording. The application can call the connection manager on the remote client, which in turn opens an Internet connection. The remote client application then connects to the personal broadcaster at the user's home.

Next, the remote client application can issue the right set of commands related to channel selection and encoder settings on the server, and begins to capture the incoming stream onto the local storage medium (e.g., hard disk drive or flash memory). This can happen in the background, so a user can be on phone call or listening to music (depending on other capabilities of the device) while the remote client is recording.

If the recording is interrupted because a network connection is lost, the live streaming content can be temporarily stored on the local (built-in or removable) storage that exists in one variation of the personal broadcaster. Once a connection between the personal broadcaster and the remote client is reestablished, the content resumes the stream from the personal broadcaster to the remote client, taking into consideration the point at which the previously interrupted transfer left off. In another variation, an on-network storage device, such as a PC, can be used to store content temporarily after a connection between the personal broadcaster and the remote client has been interrupted. In another embodiment, an entire show or media program is encoded and stored on the personal broadcaster (or in a storage device), and then transferred to the mobile device in the background. Beneficially, the transfer can be performed at a more efficient time for data transfer e.g., the file downloaded to a cellular phone overnight during non peak hours so that the content is available to the user for offline viewing the following day.

In the case where the original source of the media being streamed is an on-network storage device (using the personal broadcaster as a transcoder/transrater), transfers between the personal broadcaster and the remote client can be accomplished over time. That is, if a remote client loses network connectivity, the download pick ups and continues later at the proper spot in the content.

Another embodiment enabling a PVR on a remote device, a variation of the embodiment described above, allows the personal broadcaster to work with an on-network storage device (such as a PC or a NAS or SAN device) to provide for the user a PVR that can be accessed remotely. The personal broadcaster takes in the analog content, digitizes and encodes the content, and then streams the resulting media stream to the on-network storage device for storage. When a user wants to access the content from a remote client, the personal broadcaster acts as an arbiter between the remote client, which wants to view the content, and the on-network storage device. The personal broadcaster receives the stream from the on-network storage device and transcodes or transrates the content if necessary before repackaging and streaming it to the remote client.

Pairing Programming being Viewed with Context-Specific Content/Advertisements

One embodiment of the invention provides the ability for the client to present the user with Web pages, scrolling text with news, or other information that varies based on the content the user is currently viewing. For example, if the user is currently watching a San Francisco Giants baseball game, the user can be presented with a "news ticker" that details other baseball scores around the league, or perhaps a Web page with statistics and facts about the San Francisco Giants. The content can be embedded in the interface of the client application itself or can be presented through the launching of another application, such as a Web browser. Similarly, the user can be presented with content and context-specific advertisements. An example in the context of the same baseball game would be an advertisement from the San Francisco Giants ticket office, which hopes to attract viewers to purchase tickets to a future game.

The broadcasting system can determine the content currently being viewed by the user in a number of ways. In one embodiment, the personal broadcaster or client sends information, including the current time, the channel lineup being used (e.g., location and cable TV provider), and the current channel being tuned to, to the central server. The central server then takes the information received and examines the electronic programming guide applicable to the user's service. From information it is determined which show the user is currently viewing. Alternatively, the client can perform the programming guide lookup itself and transmit this information to the central server.

After determining what show the user is currently viewing, overlaid information and/or advertisements can be transmitted from the central server or other server on the public Internet to the client media player. Alternatively, applications, such as a Web browser, can be launched, simply sending the user to a specified URL. The client can also contain the information necessary to queue any relevant information or advertisement for display to the user. For example, the client can have stored in its memory certain advertising banners or URLs of relevant Web sites that are queued depending on what type of content the user views.

This method alleviates much of the need for transmission of content and or advertisements from a central server or other remote server.

Embodiments that include personal video recorder functionality (using local storage on the personal broadcaster or using storage of the on-network storage device) can provide for context-specific ads and information even when playing a previously recorded show. When recorded, the content is "tagged" with information indicating the programming being captured. On play back, this information can be used to prompt content specific information and ads.

Content-Specific Edge Preserving Pre-Filter

Low bit rate coding involving block based video coders produce strong blocking artifacts. To reduce the severity of these artifacts, in one embodiment of the invention, pre-filtering is employed to simplify the image content before compression. The pre-filters often comprise low pass filters, which not only smooth blocking artifacts but also undesirably reduce image details. Moreover, low pass filters are not adaptive to video content, which makes them ill-suited for perceptual video encoding. To avoid the limitations of previous pre-filters, one embodiment of media player performs a content-specific edge estimation algorithm on the media stream received from the media broadcaster. In accordance with this embodiment, an edge estimate gives the location of the details in the image that should be preserved while a motion estimate gives a classification of whether the content is in high, medium, or low motion.

In one embodiment, the media player applies a pre-filter on the received stream. The pre-filter comprises a low pass filter having pass band characteristics that are changed based on an edge estimate, a motion level estimate, and an encoding bit rate. Based on the motion level estimate and the encoding bit rate, a filter characteristic is defined for a frame. The filter characteristic is then fine tuned at the pixel level based on the edge estimate. Using this approach, a higher degree of smoothing is used for high motion contents and lower degree for low motion content, while leaving the details intact.

In one embodiment, two sets of adaptive low pass filters are defined. For low bit rate encoding, the following Gaussian filter of size 5.times.5 is used:

$$G(x,y) = 1/2\pi\sigma^2 \exp(-(x^2+y^2)/2\sigma^2).$$  ##EQU00001##

For high bit rate encoding, a low pass filter having an average mask of size 3.times.3 is used, as shown in the table below.

TABLE-US-00001 1 1 1 1.psi. 1 1 1 1

The parameters .sigma. and .psi. are varied based on the edge estimate, motion level estimate, and the encoding bit rate. Increasing .sigma. or decreasing .psi. increases the smoothness of the video, while the opposite decreases the smoothness of the video. The edge estimate, is operated at pixel level and is obtained by taking the gradient at all eight directions. This is given by:

=.SIGMA..DELTA.f.sub..theta.,.theta.{0.degree.,45.degree.,90.degree.,135.degree.,180.degree.,225.degree.,270.degree.,315.degree.}, where f.sub.0.degree.={(x,y)−(x+1,y)}, f.sub.45.degree.={(x,y)−(x,y+1)}, . . . .

If is greater than a threshold T, no pre-filtering is performed on the current pixel, thereby preserving the image details. The motion level estimate gives a classification of whether the motion is high, medium, or low motion. The estimate is based on the bits required for the current frame and the recursive average of the bits per frame. If the current frame bits are greater than .alpha. (always >1) times the recursive average, the current video content is declared as high motion, and if the current frame bits are less than .beta.(<1) times the recursive average, the video content is classified as low motion. Otherwise, it is classified as medium motion. Based on the type of motion, the filter strength is varied. For high motion content, for example, a relatively heavy smoothing filter can be applied as compared to low motion content.

This pre-filtering method not only retains the image details but also is content specific. That is, the filters are adapted to the motion type: high, medium, or low. This pre-filtering method provides non-blocky, constant quality encoded video for all motion types. Unlike conventional pre-filters this reduces the frame drops without compromising quality.

Frame Rate Regulation and Quality Control for Encoder

Most video software encoders at low bit rates dynamically drop video frames to meet some specific target bit rate, often during high motion. This dropping of frames can lead to jerky video and fluctuating quality levels. As potentially large sections of frames are dropped, the motion estimation process becomes ineffective. To avoid this problem, one embodiment of the media broadcaster regulates frame rate using a multi-level approach designed to enhance the viewing experience of the user by sustaining both frame rate and quality at each level.

In one embodiment, the encoder in the media broadcaster estimates a sustainable frame rate based on a Sustainability measure, SM. Four levels of frame rate regulation are defined. Based on SM, the frame rate is selected and an appropriate quality level is defined. Each stage of the algorithm keeps the inter-frame distance constant, preserving temporal video quality. This results in better motion estimation and acceptable spatial video quality levels.

Frame rate regulation is performed in one embodiment according to the following algorithm. The target frame rate defined by the encoder is F.sub.0. A sustainability measure, SM, determines whether the frame rate can be sustained over the time interval T. SM can be defined as the ratio of the bit pool available to the estimated bits required for the next T seconds. The bit estimate is a product of frames per T seconds with the recursive average of the bits per frame. The SM may be calculated based on the "motion" estimate and the target bit rate. The "motion" estimate is based on the recursive average of the encoded bits per frame. In one embodiment, the frame rates at subsequent levels are: F.sub.1=F.sub.0/2; F.sub.2=F.sub.0/3; and F.sub.3=F.sub.0/5.

If F.sub.i denotes the assigned frame rate for level i, based on SM, a decision is made every T whether the encoder should continue in the same level or move to a level higher or a level lower. If SM is less than a (indicating that that the current frame rate, F.sub.i, cannot be sustained for the time interval T), the encoder moves to level i+1. If the encoder is already at the lowest frame rate, F.sub.3, it stays there. This operation is again performed after every T. The level thus goes down when bit rate is not sufficient enough to cater high motion content bit rate need.

While in level i, as long as i is not 0, SM for level i−1 is checked after time interval of T. If the SM is greater than .beta.(>1), it indicates that the current content can be encoded at level i−1, so the encoder moves to level i−1. This method thus tries to maintain the inter-frame distances constant at each level thereby improving the overall video quality.

Dynamic Parameter Control for Video Encoder

In a real time video streaming environment, network characteristics change dynamically. To improve the use of the network resources, a video encoder should be able to adapt to these network changes; however, most of the standard video encoders do not support such adaptation. In accordance with one embodiment of the invention, a scheme for the Windows Media Video (WMV9) encoder is provided wherein the parameters can be changed dynamically during streaming.

The following parameters can be changed dynamically while streaming is in progress: bit rate, frame rate, video smoothness, and I-frame interval. The bit rate can adapt to the rate that can be supported by the network at a given time, and rate control buffer delay, bits per frame, and quantization step size vary according to changes in bit rate. Frame rate depends on the dynamically changed bit rate. At lower bit rates, high frame rates cannot be sustained, which creates the need in some circumstances for a dynamic frame rate. The video smoothness parameter indicates the encoded video quality. Lower bit rates supporting high values of video smoothness can cause jerky video, while low values of video smoothness at higher bit rates leads to under utilization of the available resources. Depending on the video smoothness parameter, the quantization upper bound and lower bound step values are changed, which affects the quality of the video. Because the bits required to encode I-frames are greater than bits required for P frames, I-frame intervals are larger for lower bit rates. I-frame intervals can be reduced at higher bit rates, where more bits can be afforded.

Accordingly, the encoder in the media broadcaster can dynamically adjust these parameters to adapt to the changing network characteristics and optimize use of system resources. This allows for improved performance than the standard WMV9 encoder, which does not dynamically change the above parameters in a real time streaming environment. Although described in the context of video encoding with Windows Media Video (WMV9), this method can be applied to other video compression formats, including MPEG-4, H.263, H.264, and any other compression formats that use the same or similar parameters mentioned herein.

Point and Click Interaction with Traditional CE Menus

Because the personal broadcaster digitizes, encodes and streams the analog output of the A/V source devices being used, the client presents the user with the full interface of the A/V source device. The default paradigm for navigating menus of the A/V source device that are rendered by the client is exactly the same as it would be for a user viewing the A/V source device in a more traditional fashion. That is, the mode of navigation typically involves "Up," "Down," "Right," "Left," and "Select" as its key components. However, alternative methods for interacting with menus and other lists are possible. For example, instead of pressing the "Down" command four times to highlight an item four spaces down from what is currently highlighted, an embodiment of the media player allows a user simply to point and click directly on the desired menu item. This speeds up the interaction and takes advantage of the rich human interface tools (e.g., keyboard and mouse) that are available in many computing devices but not generally used with televisions.

Hot Spot Finder

In one embodiment of the invention, the media player includes a directory of hotspots (wireless broadband networks available in public locations) stored on the client device and accessible when the client is not connected to a network. Such a directory allows the user more easily to find a location where the user can gain access to the personal media broadcaster.

Testing and Configuring a User's NAT

For users that have a home Internet gateway that includes a Network Address Translation (NAT), some configuration can be required to allow a user to access the personal broadcaster from a remote network. This is because incoming requests are rejected by many NATs unless the NAT has been explicitly instructed how to forward the incoming packets. There are many methods for solving this problem, some more desirable and automated than others. Some embodiments of the invention include a multi-step process for determining and implementing the possible solutions.

The system may first attempt to determine whether the home Internet gateway supports UPnP (Universal Plug 'N Play). If so, the personal broadcaster may be able to control the home Internet gateway using UPnP. The personal broadcaster can thus instruct the NAT to forward a specified port to the internal IP address dedicated to the personal broadcaster.

If the home Internet gateway does not support UPnP, the system may then attempt to determine the type of NAT in the home Internet gateway, and specifically whether the NAT is a full cone NAT. This detection may be performed by using the central server as a STUN server, which runs various tests to determine what the type of the NAT behind which the personal broadcaster sits. There are four basic types of NATs: full cone, restricted cone, port restricted cone, and symmetric. A full cone NAT is a NAT that allows a client behind it to receive messages from one external machine that are addressed to an IP address and port that the internal client used in sending a message to another external machine. If the personal broadcaster sits behind a full cone NAT, the following is possible: The personal broadcaster from time to time sends a message to the central server, and the central server makes a note of the IP address and port from which it was received. When a remote client wishes to connect to the personal broadcaster, it asks the central server for the address and port recently used by the personal broadcaster to send its message. The remote client can use the same IP address and port to locate and connect to the personal broadcaster. If the NAT is not a full cone NAT, another method is used.

A third possible method to use comprises a UDP "hole punching" technique. This technique, which is known to those of ordinary skill in the relevant art, would involve using the central sever as a way to "introduce" the remote client and the personal broadcaster. The method works for all NAT types except for symmetric NATs (so the STUN test would be useful for determining if this is a viable option) and uses the central server to cause both devices to send messages to one another simultaneously. Because both devices believe they are "initiating" the conversation, the return packets are permitted to flow through the NAT to the destination device.

If none of the above or other methods are viable solutions, the present invention can walk the user through the steps for manual configuration of the NAT on the home Internet gateway. To make this easy and integrated into the set up process for the personal broadcaster, the configuration screens for the home Internet gateway can be embedded in the window that houses the set up application. This provides the user with a greater sense of seamlessness.

On-Device EPG

One variation of the present invention features an electronic programming guide (EPG) that resides locally on a client. The EPG is configured at initial configuration of the personal broadcaster. The user is asked for a zip code and the service and package to which the user subscribes. Based on this information, the client application downloads an EPG that covers the next several days. From time to time, the EPG is updated via download from the central server or another server from a third party provider. The EPG can be stored locally on the client.

Beneficially, the EPG can be made interactive. Among the many features enabled by an on-device EPG, a user could search and sort programming content by a number of variables, and a single "click" on a channel can automatically tune the A/V source device and media player to the desired channel.

Community or "Buddy" List

One embodiment of the media player incorporates a "buddy list." Using the buddy list, a user can connect to personal broadcasters that reside at different locations. For example, if Charlie declares Amy as a "buddy," Charlie's personal broadcaster appears on Amy's buddy list. By choosing Charlie's personal broadcaster, Amy connects to Charlie's device. All of the necessary settings (e.g., IP address, port, password, and any other required settings) are automatically provided to the buddy.

Last Come, Last Served

Another embodiment of the invention allows only a single client to be connected to the personal broadcaster at any given time. The broadcaster may implement a number of priority schemes, one of which is last come last served. In this scheme, if a client A is connected and client B attempts to connect, priority is given to the client B. One embodiment can provide a message to client A informing the user of client A that the client is about to be disconnected. The user of client A may be provided the opportunity to override this rule and remain connected. This priority system is especially useful in the situation where a person logs in at home, then leaves the house without disconnecting and attempts to log in from a remote client.

Encryption and Security

Various known security mechanisms can be used in different embodiments of the present invention. Example of security mechanisms that can be used with the personal media broadcasting system described herein include, but are not limited to, password protection, communication over a secure link, encrypting the content sent over the remote network.

Blocking Out the Local Display

In another embodiment the media broadcaster includes A/V pass-throughs for all of the inputs, where there is an output that corresponds to each of the inputs. This saves the user from using multiple outputs on an A/V source device and may provide a complete method for prohibiting two sessions. Moreover, this embodiment can be used to prohibit the simultaneous occurrence of a client connection to a personal broadcaster and a local viewing of the A/V source which is plugged into the personal broadcaster. For example, if someone were watching a pay per view movie at home, and a user connected to the personal broadcaster tunes into the same movie, the personal broadcaster can disable its A/V outputs. Whether the A/V outputs are disabled can depend on the content. For example, in one embodiment only pay per view content triggers a blocking, whereas regular programming does not. This discrimination scheme can be integrated with an EPG, as discussed above.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. A method for playing a media stream received via a network by a media player device, the method comprising:
receiving the media stream by the media player device;
storing the received media stream in a buffer of the media player device; and
while the media stream is being provided for playback, the media player device receiving a user command to change the content of the media stream and responsively flushing the buffer prior to receiving changed content in the media stream.

2. The method of claim 1 further comprising re-filling the buffer with the media stream containing the changed content, and playing the changed content from the buffer.

3. The method of claim 2 wherein the playing of the changed content from the buffer comprises initiating playback of the changed content from the buffer at a decreased playback speed.

4. The method of claim 3 wherein playback of the changed content continues at the decreased playback speed until the buffer fills to a predetermined threshold.

5. The method of claim 3 wherein the playing of the changed content further comprises playing the received media stream at a normal playback speed after the buffer is filled to the predetermined threshold.

6. The method of claim 3, wherein the method further comprises time-stretching an audio portion of the media stream while maintaining a pitch level of the audio portion when the playback speed is decreased.

7. The method of claim 1, wherein the media stream is received via the network from a remote server, and wherein the method further comprises transmitting, responsive to the user input, a command to the remote server via the network to thereby direct the remote server to change the media stream.

8. The method of claim 1, wherein the user command changes a channel associated with the media stream.

9. The method of claim 8, wherein the method further comprises, after flushing the buffer, initially reducing the playback speed of the media stream to allow the buffer to accumulate data from the newly-selected channel.

10. The method of claim 9 further comprising increasing the playback speed of the media stream to a normal rate after the buffer has accumulated a threshold amount of data from the newly-selected channel.

11. The method of claim 1 wherein the method is performed by a media player device, and wherein the receiving of the media stream comprises the media player device receiving the media stream in real time from a placeshifting device, and wherein the method further comprises the media player device transmitting, responsive to the user input, a command to the placeshifting device via the network to thereby direct the remote server to change the media stream.

12. The method of claim 1, wherein the buffer fills at a rate slower than the media stream is received after the buffer is flushed.

13. A method for playing a media stream by a media player device, the method comprising:
receiving the media stream via a network from a media source;

storing the media stream in a buffer of the media player device;

providing, by the media player device, the media stream for playback from the buffer; and responsive to receiving a user command to change the content of the media stream, the media player device:
flushing the buffer;
providing an instruction to the media source to change the content of the media stream;
after flushing the buffer, refilling the buffer with changed content of the media stream; and
subsequently providing the changed content from the buffer for playback.

14. The method of claim 13 wherein the changed content is initially played back at a reduced speed without waiting for the buffer to fill to a predetermined threshold.

15. The method of claim 13 wherein the user command changes a television channel received by the media source to a new channel, wherein the changed content comprises programming received on the new channel, and wherein the instruction provided to the media source directs the media source to obtain the programming received on the new channel.

16. The method of claim 15 wherein the subsequent playing comprises playing the changed content from the new channel at a reduced speed until the buffer fills to a predetermined threshold, and thereafter playing the changed content from the new channel at a normal playback speed.

17. A system for playing a media stream for a user, wherein the media stream is received over a network from a source, the system comprising:

an interface to the network;

a buffer;

an input device configured to receive an input from a user; and a processor configured to receive the media stream via the network, to store the media stream in the buffer as the media stream is received, to respond to the input from the user by flushing the buffer, by transmitting an instruction to the source via the interface to thereby adjust the content of the media stream received from the source, and by providing the adjusted content of the media stream for playback from the buffer.

18. The system of claim 17 wherein the processor is further configured to initially playback the adjusted media stream from the buffer at a decreased playback speed without waiting for the buffer to fill to the predetermined threshold, and then to subsequently playback the received media stream from the buffer at the normal rate after the buffer has filled to the pre-determined threshold.

19. The system of claim 17 wherein the user command represents a user command to change a programming channel in the media stream from a previous program to a newly-selected program, and wherein the content from the newly-selected program is provided for playback after the buffer is flushed.

20. The system of claim 19, wherein the instruction directs the source to change a television channel by the source and thereby receive the newly-selected program.

* * * * *